United States Patent
Kim

(10) Patent No.: US 12,277,771 B2
(45) Date of Patent: Apr. 15, 2025

(54) APPARATUS AND METHOD FOR TRACKING MISSING PERSON BASED ON ATTRIBUTE

(71) Applicant: ONEMORESECURITY INC., Sejong (KR)

(72) Inventor: Min-Sik Kim, Sejong (KR)

(73) Assignee: OneMoreSecurity Inc., Sejong-si (KR)

( * ) Notice: Subject to any disclaimer, the term of this patent is extended or adjusted under 35 U.S.C. 154(b) by 0 days.

(21) Appl. No.: 18/009,560

(22) PCT Filed: Nov. 8, 2022

(86) PCT No.: PCT/KR2022/017439
§ 371 (c)(1),
(2) Date: Dec. 9, 2022

(87) PCT Pub. No.: WO2024/101466
PCT Pub. Date: May 16, 2024

(65) Prior Publication Data
US 2024/0320977 A1    Sep. 26, 2024

(51) Int. Cl.
*G06V 20/52* (2022.01)
*G06T 7/20* (2017.01)
(Continued)

(52) U.S. Cl.
CPC ............. *G06V 20/52* (2022.01); *G06T 7/20* (2013.01); *G06V 10/44* (2022.01); *G06V 10/761* (2022.01);
(Continued)

(58) Field of Classification Search
CPC .... G06V 20/52; G06V 10/762; G06V 10/761; G06V 10/44; G06V 2207/30241; G06T 7/20
(Continued)

(56) References Cited

U.S. PATENT DOCUMENTS

| | | | |
|---|---|---|---|
| 2019/0224852 A1* | 7/2019 | Choi | B25J 11/00 |
| 2022/0319232 A1* | 10/2022 | Kim | G06V 40/161 |
| 2022/0397686 A1* | 12/2022 | Scacchi | G01S 19/485 |

FOREIGN PATENT DOCUMENTS

| | | | | |
|---|---|---|---|---|
| JP | 2010257451 | | 11/2010 | |
| JP | 2010257451 A | * | 11/2010 | G06T 1/00 |

(Continued)

OTHER PUBLICATIONS

Mayssa Frikha, et al. "People search based on attributes description provided by an eyewitness f or video surveillance applications," Multimedia Tools and Applications, Jan. 1, 2019.

(Continued)

*Primary Examiner* — Behrooz M Senfi
(74) *Attorney, Agent, or Firm* — Brooks, Cameron & Huebsch, PLLC

(57) ABSTRACT

Disclosed herein are an apparatus and method for tracking a missing person based on attributes. The apparatus for tracking a missing person based on attributes according to an embodiment of the present disclosure includes memory in which at least one program is recorded and a processor for executing the program. The program may perform receiving a missing person report including missing situation information and attribute information representing appearance of a missing person, acquiring CCTV video based on the missing situation information, extracting full-body image candidates assumed to be of the missing person, among the full-body images of human objects in the CCTV video, based on the attribute information, receiving a selection for one of the extracted full-body image candidates as the full-body image of the missing person, and tracking the travel path of the missing person by analyzing CCTV video based on the selected full-body image of the missing person.

10 Claims, 7 Drawing Sheets

(51) Int. Cl.
*G06V 10/44* (2022.01)
*G06V 10/74* (2022.01)
*G06V 10/762* (2022.01)

(52) U.S. Cl.
CPC .. *G06V 10/762* (2022.01); *G06T 2207/30241* (2013.01)

(58) Field of Classification Search
USPC .......................................................... 382/118
See application file for complete search history.

(56) References Cited

FOREIGN PATENT DOCUMENTS

| KR | 20180006016 | | 1/2018 | | |
|---|---|---|---|---|---|
| KR | 102270899 | | 6/2021 | | |
| KR | 102270899 | B1 * | 6/2021 | ............. | G06V 20/64 |
| KR | 1020220118184 | | 8/2022 | | |
| KR | 102452918 | B1 * | 10/2022 | ............. | G06Q 50/26 |

OTHER PUBLICATIONS

Ammarah Farooq, et al. "A Convolutional Baseline for Person Re-Identification Using Vision and Language Descriptions," Journal of Latex Class Files, Feb. 20, 2020.

\* cited by examiner

APPARATUS AND METHOD FOR TRACKING MISSING PERSON BASED ON ATTRIBUTE

TECHNICAL FIELD

The disclosed embodiment relates to technology for tracking the travel path of a missing person.

BACKGROUND ART

Korean Patent Application Publication No. 10-2018-0006016 (referred to as a 'prior art document' hereinbelow) provides a service for locating a missing child based on face recognition using an image of the missing child.

However, in the prior art document, a missing person is able to be tracked on the assumption that an image of the missing person is acquired. When there is no image of the missing person, it may take a considerable amount of time to acquire an image containing the missing person at the time of disappearance.

Accordingly, it is impossible to quickly respond to the missing person report, and when the missing person is a child or an old dementia patient, a secondary accident is likely to occur while the missing person is moving, and the golden hour may pass before responding to the missing person report.

Also, even though an image of the missing person is acquired, the acquired image may be quite different from the appearance of the missing person at the time of disappearance. This is because the appearance of a missing person may change depending on the age, the situation, the clothes, the hairstyle, or the like. Therefore, when a missing person is tracked using an image containing different appearance, there is a problem in that the accuracy of a tracking result can be significantly degraded.

Also, when a reporter is not accustomed to using a communication device for transferring images, it may not be easy to acquire an image.

DISCLOSURE

Technical Problem

An object of the disclosed embodiment is to enable, after a missing person is reported, the path of the missing person to be quickly tracked even though an image of the missing person is not present.

Another object of the disclosed embodiment is to improve the accuracy of a result of tracking a missing person based on the attribute information of the missing person at the time of disappearance.

A further object of the disclosed embodiment is to quickly track a missing person, thereby preventing a secondary accident from occurring to the missing person.

Technical Solution

An apparatus for tracking a missing person based on attributes according to an embodiment includes memory in which at least one program is recorded and a processor for executing the program, and the program may perform receiving a missing person report including missing situation information and attribute information for representing appearance of a missing person, acquiring CCTV video based on the missing situation information, extracting full-body image candidates assumed to be of the missing person, among full-body images of human objects contained in the acquired CCTV video, based on the attribute information, receiving a selection for one of the extracted full-body image candidates as a full-body image of the missing person, and analyzing CCTV video based on the selected full-body image of the missing person, thereby tracking the travel path of the missing person.

Here, when receiving the missing person report, the program may output an attribute information input interface for representing the appearance of the missing person, and the attribute information input interface may include a missing person attribute registration window in which a predetermined number of attributes are listed and an attribute selection window in which selectable options for each of the attributes are displayed.

Here, when extracting the full-body image candidates, the program may perform extracting the full-body images of the respective human objects contained in the acquired CCTV video, calculating the degree of matching between each of the full-body images and an attribute for representing the appearance of the missing person based on deep-learning, and selecting a predetermined number of full-body image candidates in descending order of calculated degree of matching.

Here, when calculating the degree of matching, the program may perform inferring probabilities that the full-body image has respective attributes representing the appearance of the missing person based on a pretrained deep-learning model and adding the inferred probabilities of having the respective attributes.

Here, when calculating the degree of matching, the program may further perform multiplying each of the inferred probabilities of having the respective attributes by a per-attribute inference accuracy of the deep-learning model and then perform adding the inferred probabilities of having the respective attributes.

Here, when tracking the travel path of the missing person, the program may include collecting CCTV video based on the missing situation information, extracting image frames containing at least one human object from the collected CCTV video, extracting full-body feature information of the missing person from an image frame assumed to contain the missing person, among the image frames, based on the extracted image of the missing person, extracting full-body feature information of all of people contained in the image frames and clustering the image frames into a predetermined number of groups based on the extracted feature information, selecting a track group, among the predetermined number of groups, based on the similarity with the full-body feature information of the missing person, and tracking the travel path along which the missing person moves based on time and location information of image frames included in the track group.

Here, when tracking the travel path of the missing person, the program may include collecting CCTV video based on the missing situation information, extracting image frames containing at least one human object from the collected CCTV video, extracting attribute information from full-body images of all people contained in the image frames and clustering the image frames into a predetermined number of groups based on the extracted attribute information, selecting a track group, among the predetermined number of groups, based on the similarity with attribute information of the full-body of the missing person, and tracking the travel path along which the missing person moves based on time and location information of image frames included in the track group.

A method for tracking a missing person based on attributes according to an embodiment may perform receiving a missing person report including missing situation information and attribute information for representing appearance of a missing person, acquiring CCTV video based on the missing situation information, extracting full-body image candidates assumed to be of the missing person, among full-body images of human objects contained in the acquired CCTV video, based on the attribute information, receiving a selection for one of the extracted full-body image candidates as a full-body image of the missing person, and analyzing CCTV video based on the selected full-body image of the missing person, thereby tracking the travel path of the missing person.

Here, receiving the missing person report may comprise outputting an attribute information input interface for representing the appearance of the missing person, and the attribute information input interface may include a missing person attribute registration window in which a predetermined number of attributes are listed and an attribute selection window in which selectable options for each of the attributes are displayed.

Here, extracting the full-body image candidates may include extracting the full-body images of the respective human objects contained in the acquired CCTV video, calculating the degree of matching between each of the full-body images and an attribute for representing the appearance of the missing person based on deep-learning, and selecting a predetermined number of full-body image candidates in descending order of calculated degree of matching.

Here, calculating the degree of matching may comprise inferring probabilities that the full-body image has respective attributes representing the appearance of the missing person based on a pretrained deep-learning model and adding the inferred probabilities of having the respective attributes.

Here, calculating the degree of matching may further include multiplying each of the inferred probabilities of having the respective attributes by a per-attribute inference accuracy of the deep-learning model before adding the inferred probabilities of having the respective attributes.

Advantageous Effects

According to the disclosed embodiment, after a missing person is reported, the path of the missing person may be quickly tracked even though an image of the missing person is not present.

According to the disclosed embodiment, the accuracy of a result of tracking a missing person may be improved based on the attribute information of the missing person at the time of disappearance.

The disclosed embodiment may prevent a secondary accident from occurring to a missing person by quickly tracking the missing person.

BEST MODE

Figure 1:
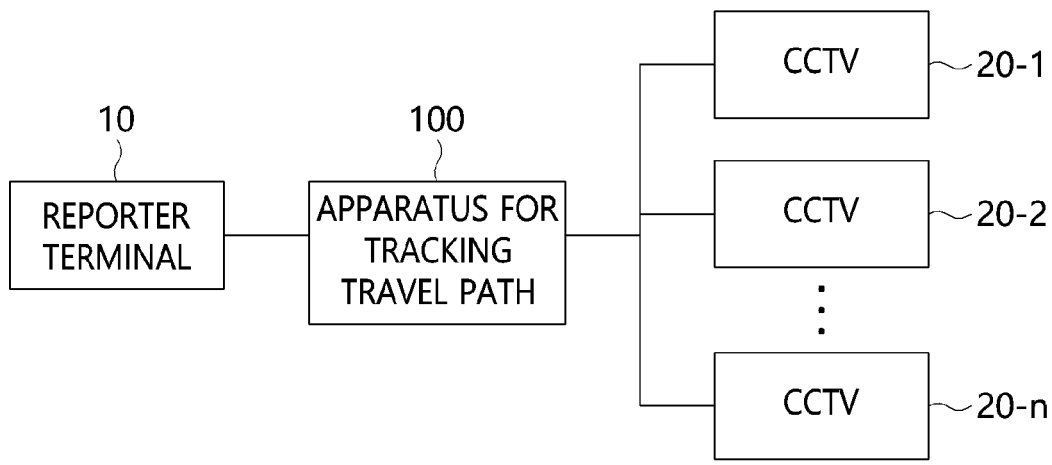
FIG. 1 is a schematic block diagram of a system including an apparatus for tracking a missing person based on attributes according to an embodiment.

The advantages and features of the present disclosure and methods of achieving them will be apparent from the following exemplary embodiments to be described in detail with reference to the accompanying drawings. However, the present disclosure is not limited to the following exemplary embodiments, and may be implemented in various forms. The exemplary embodiments are provided only to fully disclose the present disclosure and to let those skilled in the art to which the present disclosure pertains know the category of the present disclosure, and the present disclosure is to be defined based only on the claims. The same reference numerals or the same reference designators denote the same elements throughout the specification.

Although the terms "first," "second," etc. may be used herein to describe various elements, these elements are not intended to be limited by these terms. These terms are only used to distinguish one element from another element. Therefore, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises" or "comprising" when used herein, specify the presence of stated elements or steps, but do not preclude the presence or addition of one or more other elements or steps.

Unless differently defined, all terms used herein have the same meanings as terms generally understood by those skilled in the art to which the present disclosure pertains. Terms identical to those defined in generally used dictionaries are not to be interpreted as having ideal or excessively formal meanings unless they are definitively defined in the present specification.

Hereinafter, an apparatus and method for tracking a missing person based on attributes according to an embodiment will be described in detail with reference to FIGS. 1 to 8.

FIG. 1 is a schematic block diagram of a system including an apparatus for tracking a missing person based on attributes according to an embodiment.

Referring to FIG. 1, the apparatus 100 for tracking a missing person based on attributes according to an embodiment may be connected to a reporter terminal 10 and multiple Closed Circuit Televisions (CCTVs) 20-1, 20-2, . . . , 20-n over a communication network.

Here, the communication network refers to a communication network that provides an access path via which the reporter terminal is capable of transmitting and receiving data after access to the apparatus 100 for tracking a missing person based on attributes. The communication network may encompass, for example, wired networks, such as Local Area Networks (LANs), Wide Area Networks (WANs), Metropolitan Area Networks (MANs), Integrated Service Digital Networks (ISDNs), and the like, and wireless networks, such as wireless LANs, CDMA, Bluetooth, satellite communication, and the like, but the scope of the present disclosure is not limited thereto.

The reporter terminal 10 may collectively refer to devices that can be carried and used by a user, such as a mobile phone, a smartphone, a smart pad, and the like, and desktop computers.

Here, a missing person case report may be registered whereby a reporter directly registers missing case report information, or may be registered through a missing-person-locating service provider or a police officer in a nearby police station by delivering such information verbally by phone or face to face. Therefore, the reporter terminal 10 may be a terminal possessed by the reporter, or a terminal possessed by the service provider or the police officer.

According to an embodiment, the reporter terminal 10 may access the apparatus 100 for tracking a missing person based on attributes and register missing person case report information through a web interface. According to another embodiment, an application for providing a missing-person-locating service is installed in the reporter terminal 10, and the missing person case report information may be registered through the interface provided by the application for providing the missing-person-locating service.

Here, the missing person case report information may include missing situation information, including a time, a location, and the like at the time of disappearance, and missing person attribute information, which is physical appearance features of a missing person. For example, the missing person attribute information may be feature information of the clothes, the hairstyle, the shoes, the accessories, and the like worn by a missing person when the missing person disappeared. When a missing person report is received, such information may be received verbally, because an image of a missing person cannot be immediately obtained in many cases.

Also, the reporter terminal 10 may output candidate images for a missing person, which are extracted by the apparatus 100 for tracking a missing person based on attributes, through an interface and transfer a missing-person's image selected by the reporter to the apparatus 100 for tracking a missing person based on attributes.

Meanwhile, the multiple CCTVs 20-1, 20-2, . . . , 20-N may be managed through a control center system (not illustrated). Here, the apparatus 100 for tracking a missing person based on attributes is described as performing all of the operations of acquiring video and tracking a missing person using the multiple CCTVs 20-1, 20-2, . . . , 20-N for convenience of description, but the present disclosure is not limited thereto.

That is, after an image of a missing person is selected based on attributes, the apparatus 100 for tracking a missing person based on attributes may request the control center system to track the missing person using the selected image of the missing person, and tracking the missing person may be alternatively performed by a missing-person-tracking server (not illustrated) included in the control center system.

Figure 2:
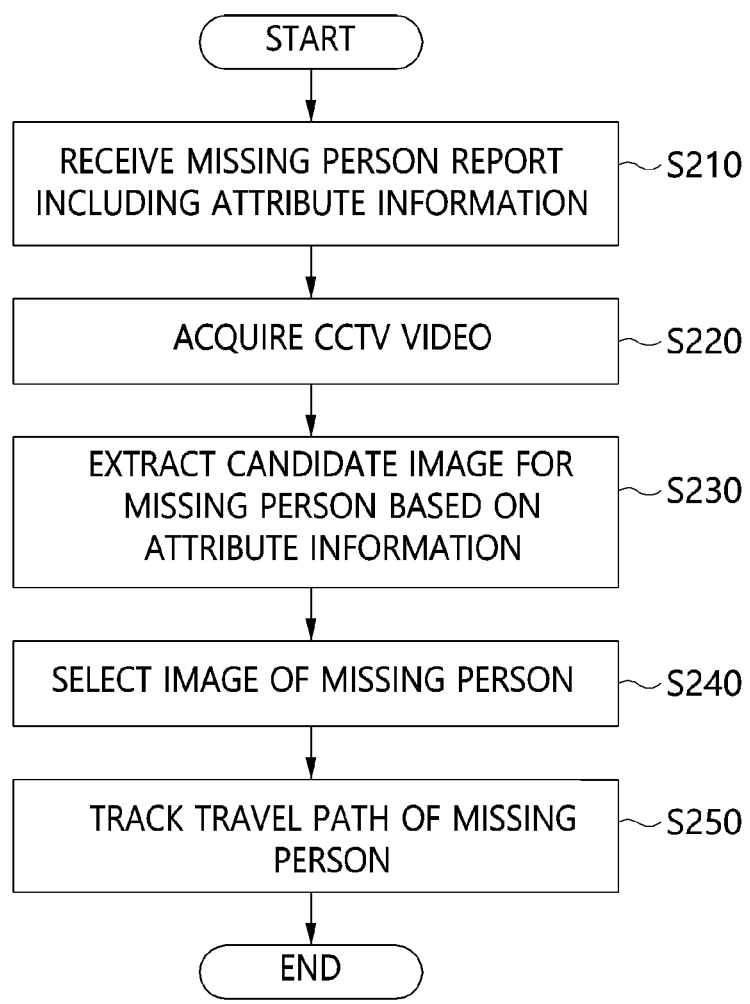
FIG. 2 is a flowchart for explaining a method for tracking a missing person based on attributes according to an embodiment.

FIG. 2 is a flowchart for explaining a method for tracking a missing person based on attributes according to an embodiment.

Referring to FIG. 2, the method for tracking a missing person based on attributes according to an embodiment may include receiving a missing person report, including missing situation information and attribute information for representing the appearance of a missing person, at step S210, acquiring CCTV video based on the missing situation information at step S220, extracting full-body image candidates assumed to be of the missing person, among the full-body images of human objects contained in the acquired CCTV video, based on the attribute information at step S230, receiving a selection for one of the extracted full-body image candidates as a full-body image of the missing person at step S240, and tracking the travel path of the missing person by analyzing CCTV video based on the selected full-body image of the missing person at step S250.

Here, at the step (S210) of receiving the missing person report according to an embodiment, an attribute information input interface for representing the appearance of the missing person may be output, and attribute information representing the physical appearance features of the missing person may be received through the attribute information input interface.

Figure 3:
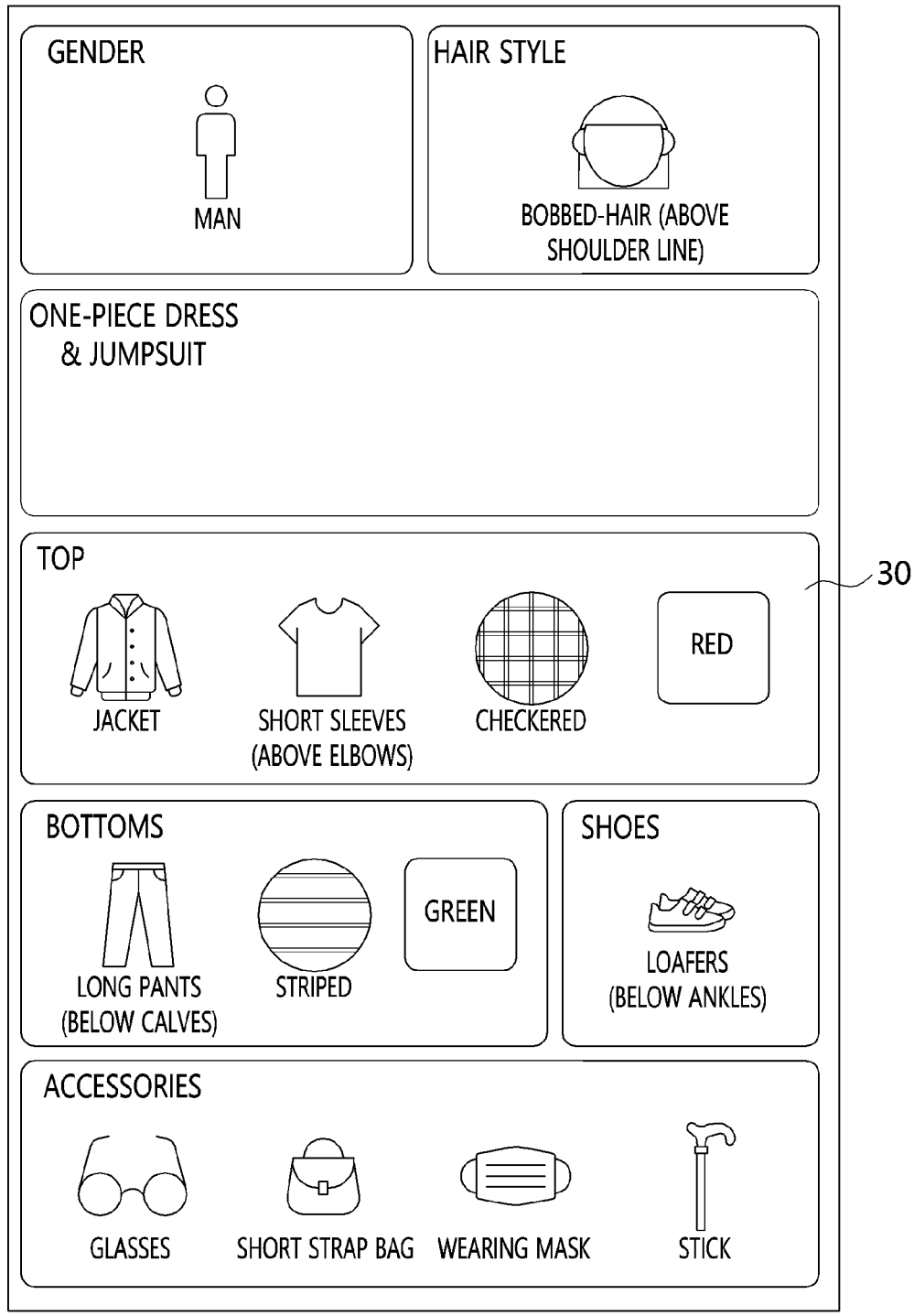
FIG. 3 and FIG. 4 are exemplary views of an attribute information input interface page according to an embodiment.
Figure 4:
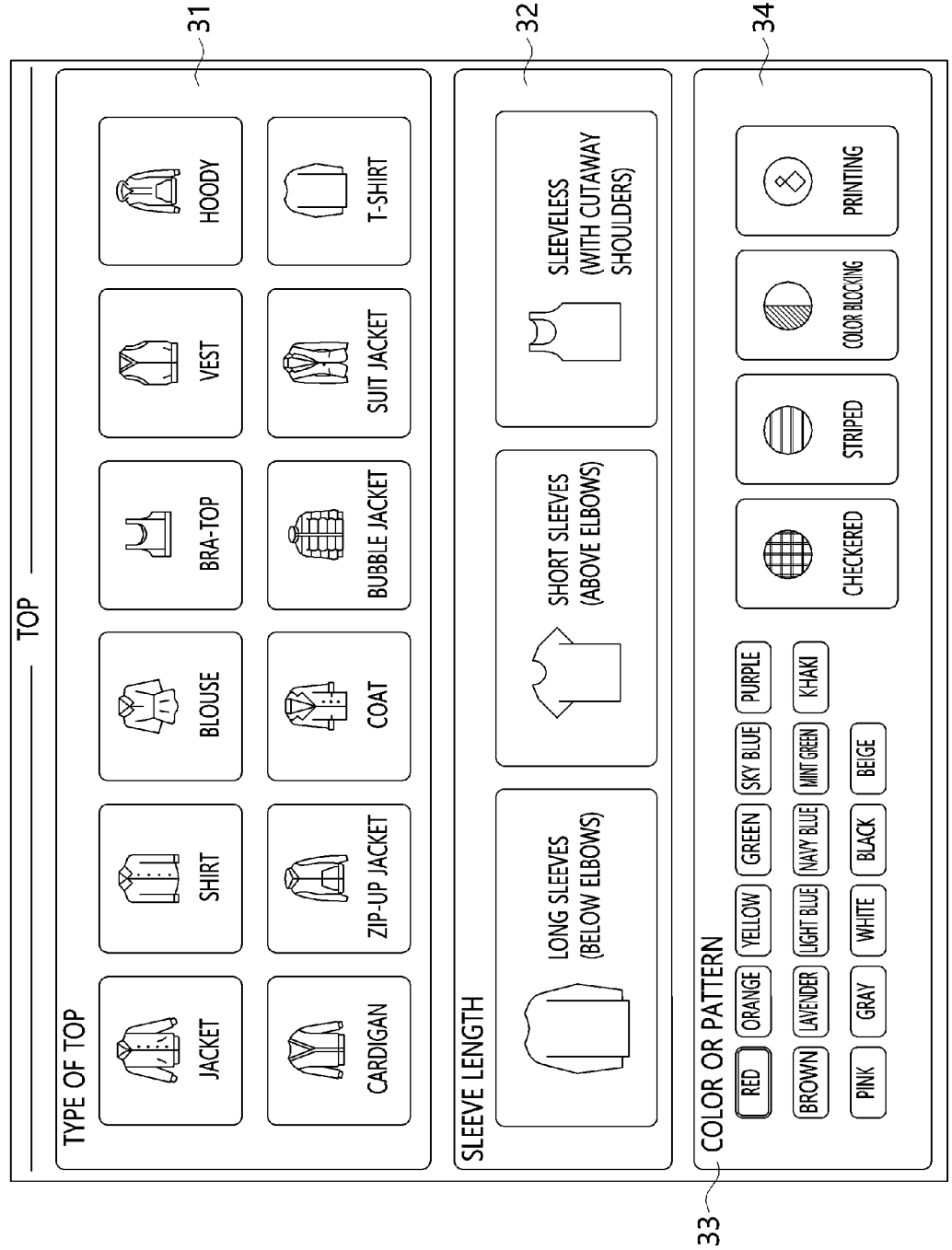

FIG. 3 and FIG. 4 are exemplary views of an attribute information input interface page according to an embodiment.

Referring to FIG. 3 and FIG. 4, the attribute information input interface may include a missing person attribute registration window (shown in FIG. 3) in which a predetermined number of attributes are listed and an attribute selection window (shown in FIG. 4) in which selective options for each attribute are displayed.

Referring to FIG. 3, various attributes for representing the physical appearance features of a missing person, such as gender, a hairstyle, clothes (a one-piece dress and a jumpsuit, a top, bottoms, and shoes), accessories, and the like, may be classified and listed in the missing person attribute registration window, and missing person attribute information corresponding to each of the attributes may be registered by a reporter.

For example, when the 'top' 30 is selected by a mouse click or the like input by a reporter in the missing person attribute registration window, the attribute selection window for the attribute 'top' 30, such as that illustrated in FIG. 4, may be output.

Referring to FIG. 4, various options for representing the attribute 'top' 30, such as the type of top 31, a sleeve length 32, a color or pattern 33, and a patter 34, are listed, and when an option is selected by a mouse click or the like input by a reporter, the selected option may be registered as the missing person information with respect to the attribute 'top' 30 in the missing person attribute registration window.

That is, referring to FIG. 3, 'jacket', 'short sleeves', 'checkered', and 'red' are selected by a reporter and registered as attribute information for 'top' 30.

Here, the number of selectable attributes may vary and range from 65 to 100, and among the selectable attributes, attributes that can be registered as missing person attribute information may be limited to 5 to 10 in number. This is because, when there is an excessive number of attributes, too much time may be consumed for the step (S230) of extracting the full-body image candidates.

Also, the attribute information input interface described above is an example, and the present disclosure is not limited thereto.

Meanwhile, the missing situation information may include information about the time of disappearance and information about the location of disappearance. However, when a reporter does not know the exact time and location of disappearance, the missing situation information may include the location of a place where the missing person is assumed to have visited and the estimated time of visit.

Accordingly, at the step (S220) of acquiring the CCTV video according to an embodiment, all of the video images during the visit hours are acquired from the CCTVs located at the places where the missing person is assumed to have visited by referring to the missing situation information.

Figure 5:
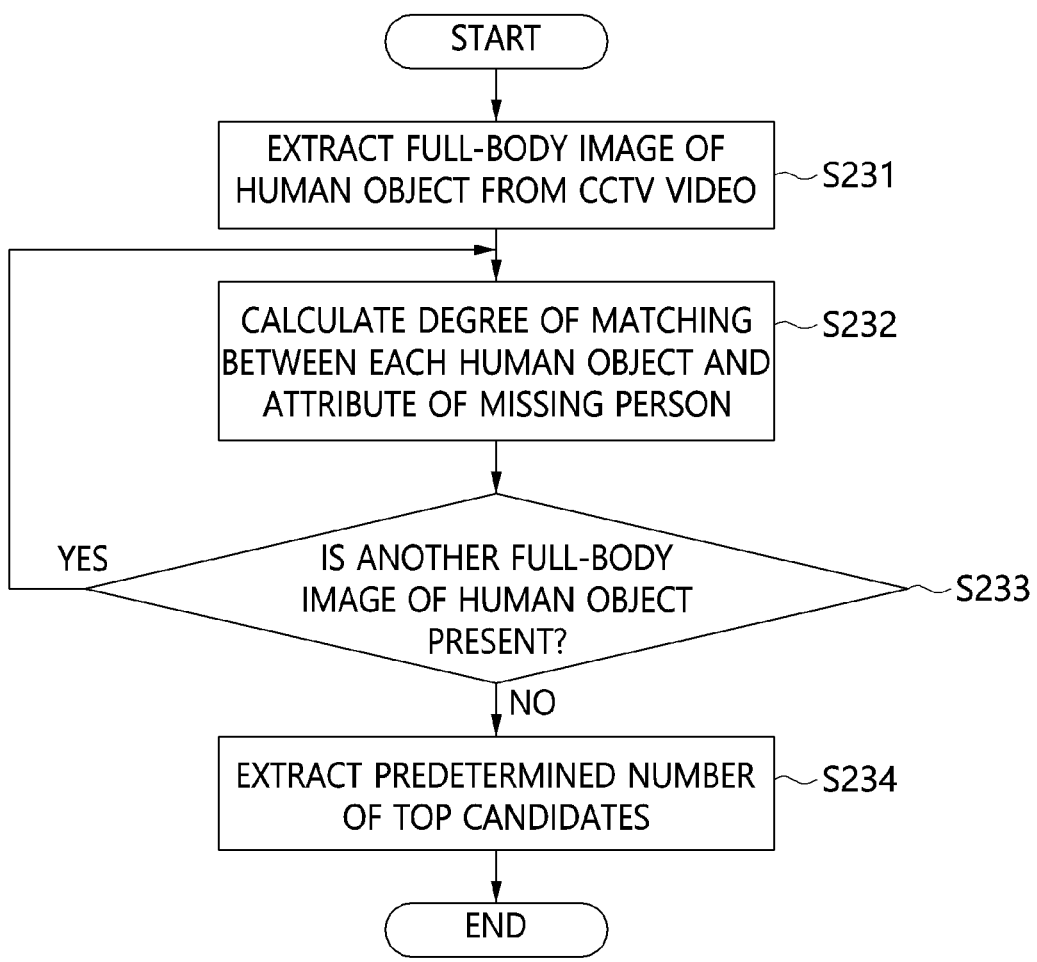
FIG. 5 is a flowchart for explaining the step of extracting full-body image candidates assumed to be of a missing person according to an embodiment.
Figure 6:
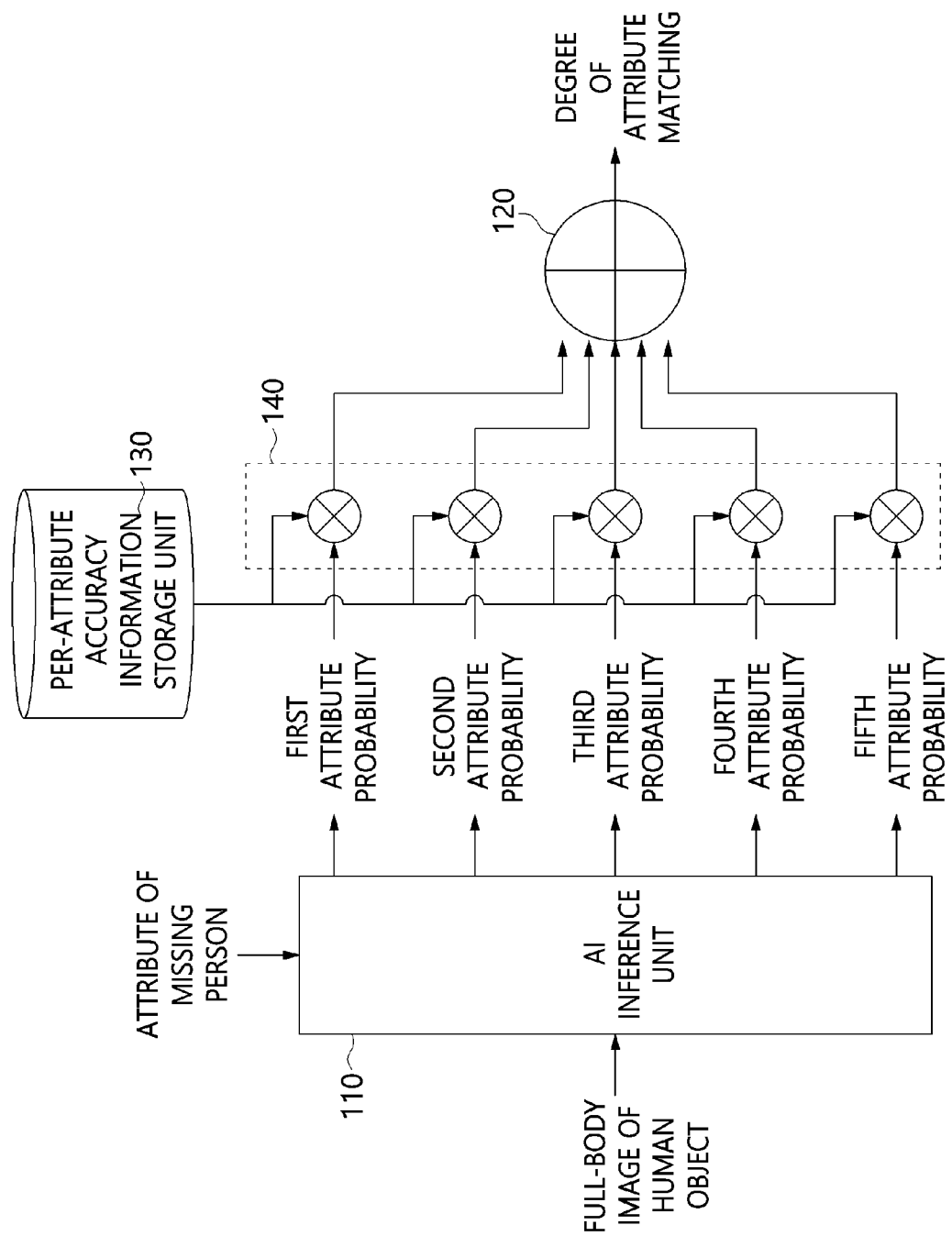
FIG. 6 is an exemplary view of calculation of the degree of attribute matching based on deep-learning according to an embodiment.

FIG. 5 is a flowchart for explaining the step of extracting the full-body image candidates assumed to be of a missing person according to an embodiment, and FIG. 6 is an exemplary view of calculation of the degree of attribute matching based on deep-learning according to an embodiment.

Referring to FIG. 5, the step (S230) of extracting the full-body image candidates may include extracting the full-body images of respective human objects contained in the acquired CCTV video at step S231, calculating the degree of matching between each of the full-body images and an attribute for representing the appearance of the missing person based on deep-learning at step S232, and selecting a predetermined number of full-body image candidates in descending order of calculated degree of matching at step S234.

Here, at the step (S231) of extracting the full-body images according to an embodiment, when CCTV video is provided from a video management system (VMS) managed in the control center, frames are extracted from the video, and the full-body image of each of the objects estimated as humans is extracted from the extracted frames based on a pretrained deep-learning model.

Also, the step (S232) of calculating the degree of attribute matching according to an embodiment may be repeatedly performed at step S233 as many times as the number of extracted full-body images.

Also, referring to FIG. 6, the step (S232) of calculating the degree of attribute matching according to an embodiment may include inferring, by an AI inference unit 110, the probabilities that the full-body image has respective attributes representing the appearance of the missing person based on the pretrained deep-learning model and adding, by an addition unit 120, the inferred probabilities of having the respective attributes.

Here, the AI inference unit 110 outputs the result acquired by inferring whether the attributes of the missing person are present in the input human object image based on the deep-learning model, which is pretrained to infer whether each of the various attributes included in the above-described attribute information input interface is present. That is, only whether the attributes of the missing person are present is inferred.

Here, the deep-learning model may be implemented based on various learning algorithms, including a convolutional neural network (CNN) algorithm, according to an embodiment.

According to an embodiment, the AI inference unit 110 may be alternatively designed to output a value indicative of having an attribute (1) or not having an attribute (0) for each full-body image depending on whether each of the attributes of a missing person is present, as shown in Table 1 below.

TABLE 1

| full-body image | attribute 1 | attribute 2 | attribute 3 | attribute 4 | attribute 5 | total |
|---|---|---|---|---|---|---|
| 1 | 1 | 1 | 1 | 1 | 0 | 4 |
| 2 | 1 | 0 | 0 | 1 | 1 | 3 |
| 3 | 1 | 1 | 1 | 1 | 1 | 5 |
| ... | | | | | | |
| N | 1 | 1 | 1 | 1 | 0 | 4 |

Accordingly, in the example of Table 1, the full-body image 3, the total score of which is 5 for the five attributes, may be included in a candidate group. Also, according to another embodiment, the AI inference unit 110 may be alternatively designed to output a probability value ranging from 0 to 1 for the information about whether each of the attributes of a missing person is present. To this end, for example, when the AI inference unit 110 is based on a CNN, the Softmax function may be used as the activation function of the last node at the fully-connected layer.

Meanwhile, the deep-learning model, which is pretrained to infer whether each of various attributes used in the AI inference unit 110 is present, may have a difference in the inference accuracy for each of the attributes in a training process. That is, there may be an attribute that is well inferred and an attribute that is not well inferred due to the size of the attribute or any of various reasons.

Accordingly, referring to FIG. 6, at the step (S232) of calculating the degree of attribute matching according to an embodiment, multiplying, by a multiplication unit 140, each of the inferred probabilities of having the respective attributes by a per-attribute inference accuracy of the deep-learning model, which is previously stored in a per-attribute accuracy information storage unit 130, may be further performed.

That is, using AI vision technology, the candidate group of human objects that have as many attributes matching the attributes of a missing person as possible in the CCTV video may be provided to the reporter through the above-described process.

Then, the CCTV video is analyzed at step S250 based on the missing-person's full-body image selected from the candidate group, whereby the travel path of the person presumed to be the same person as the missing person is tracked.

Figure 7:
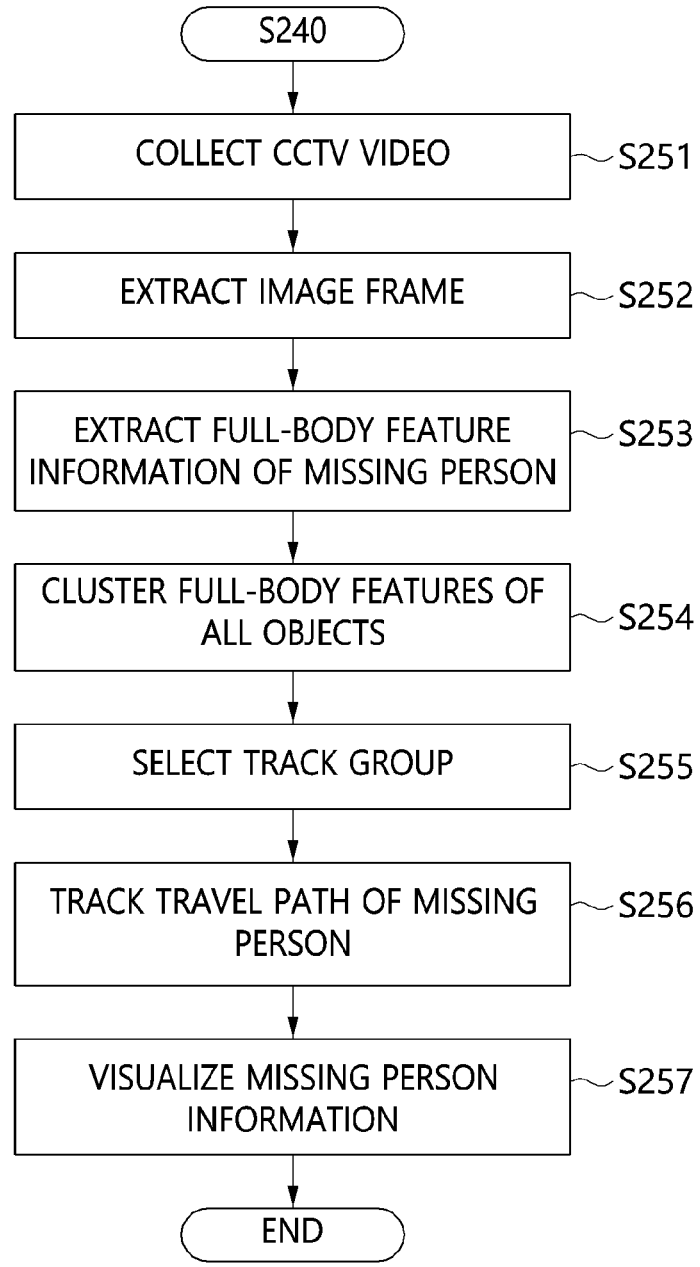
FIG. 7 is a flowchart for explaining the step of tracking a missing person according to an embodiment.

FIG. 7 is a flowchart for explaining the step of tracking a missing person according to an embodiment.

Referring to FIG. 7, based on information about the location at which the missing person disappeared and information about the time of disappearance, the apparatus 100 for tracking a missing person based on attributes collects CCTV video recorded at the corresponding location and time at step S251.

The apparatus 100 for tracking a missing person based on attributes extracts image frames that contain at least one person from the collected CCTV video at step S252.

The apparatus 100 for tracking a missing person based on attributes extracts the full-body feature information of the missing person from the image frame assumed to contain the missing person, among the image frames, based on the image of the missing person at step S253.

Specifically, the apparatus 100 for tracking a missing person based on attributes obtains facial feature information of all people contained in the extracted image frames and obtains an image frame containing the missing person by analyzing the similarity with the facial feature information extracted from the image of the missing person.

Subsequently, the apparatus 100 for tracking a missing person based on attributes extracts the full-body area image of the missing person from the obtained image frame and then extracts the full-body feature information of the missing person.

Specifically, the apparatus 100 for tracking a missing person based on attributes detects a facial area in the image and detects the facial feature points in the detected facial area through a 3D model estimation method. That is, the main parts of a face, such as eyes, a nose, lips, and eyebrows, namely, feature points representing landmarks are detected.

Subsequently, the apparatus 100 for tracking a missing person based on attributes normalizes the facial area based on the detected feature points. That is, the extracted facial area may be a profile, rather than a full-face view, depending on the posture of the person capturing the image or the person captured in the image, the extracted facial area may vary depending on changes in facial expressions, the size of the facial area may vary depending on the distance between the person capturing the image and the person captured in the image, and the brightness and the like of the image may vary depending on the lighting condition at the time of capturing the image. In this case, even though images capturing the same person are provided, the feature information to be extracted therefrom may vary.

Accordingly, the extracted facial area has to be normalized in order to obtain robustness regardless of the posture or the distance. For example, correction may be performed such that the extracted facial areas are directed straight forward based on the extracted positions of two eyes, correction may be performed such that the same facial expression can be seen based on the extracted positions of eyes, a nose, and lips, the facial area image may be corrected to have a uniform size based on the extracted distance between two eyes, and the brightness of the facial area may be corrected to have a preset value.

Subsequently, the apparatus 100 for tracking a missing person based on attributes may calculate feature vectors from the normalized facial area based on a convolutional neural network (CNN).

Referring again to FIG. 7, the apparatus 100 for tracking a missing person based on attributes extracts full-body feature information of all of the people contained in the image frames and clusters the image frames into a predetermined number of groups based on the extracted feature information at step S254. Here, this procedure may be performed based on a pretrained AI cluster classification model.

The apparatus 100 for tracking a missing person based on attributes selects a track group, among the predetermined number of groups, based on the similarity with the full-body feature information of the missing person at step S255. That is, the image frame groups of which the similarity with the full body feature information of the missing person is equal to or grater than a predetermined threshold may be selected.

Subsequently, the apparatus 100 for tracking a missing person based on attributes tracks the travel path of the missing person based on the time and location information of the image frames included in the track group at step S256. The travel path of the missing person may be marked on a map.

The apparatus 100 for tracking a missing person based on attributes visualizes the tracked travel path of the missing person at step S257.

For example, the apparatus 100 for tracking a missing person based on attributes may display the missing person case information on digital signage (not illustrated) located on the travel path of the missing person. Here, multiple digital signage displays are outdoor advertising devices using a digital information display (DID), and may be an advertising board, the advertising content of which can be controlled by a control center through a communication network. These multiple digital signage displays are installed in places with a large floating population, e.g., subway stations, bus stops, elevators in apartment buildings, banks, and the like. Accordingly, the apparatus 100 for tracking a missing person based on attributes enables the information about the missing person who is being tracked to be displayed through the digital signage displays, whereby the missing person may be quickly found by citizens.

Meanwhile, according to another embodiment, the feature information used at steps S253 to S255 may be replaced with attributes representing the appearance of a person, used in FIGS. 2 to 6.

In this case, because the attribute information of the missing person is already obtained, step S253 is skipped, and the apparatus 100 for tracking a missing person based on attributes may alternatively perform extracting attribute information from the full-body images of all of the people contained in the image frames based on a deep-learning model at step S254, clustering the image frames into a predetermined number of groups based on the extracted attribute information, and selecting a track group from the predetermined number of groups based on the similarity with the attribute information of the full body of the missing person at step S255. Alternatively, as in steps S234 and S235, the degree of matching between the attribute of the missing person and those in the image frames included in the predetermined number of groups is calculated, and the track group may be selected based on the order of calculated degree of matching.

Figure 8:
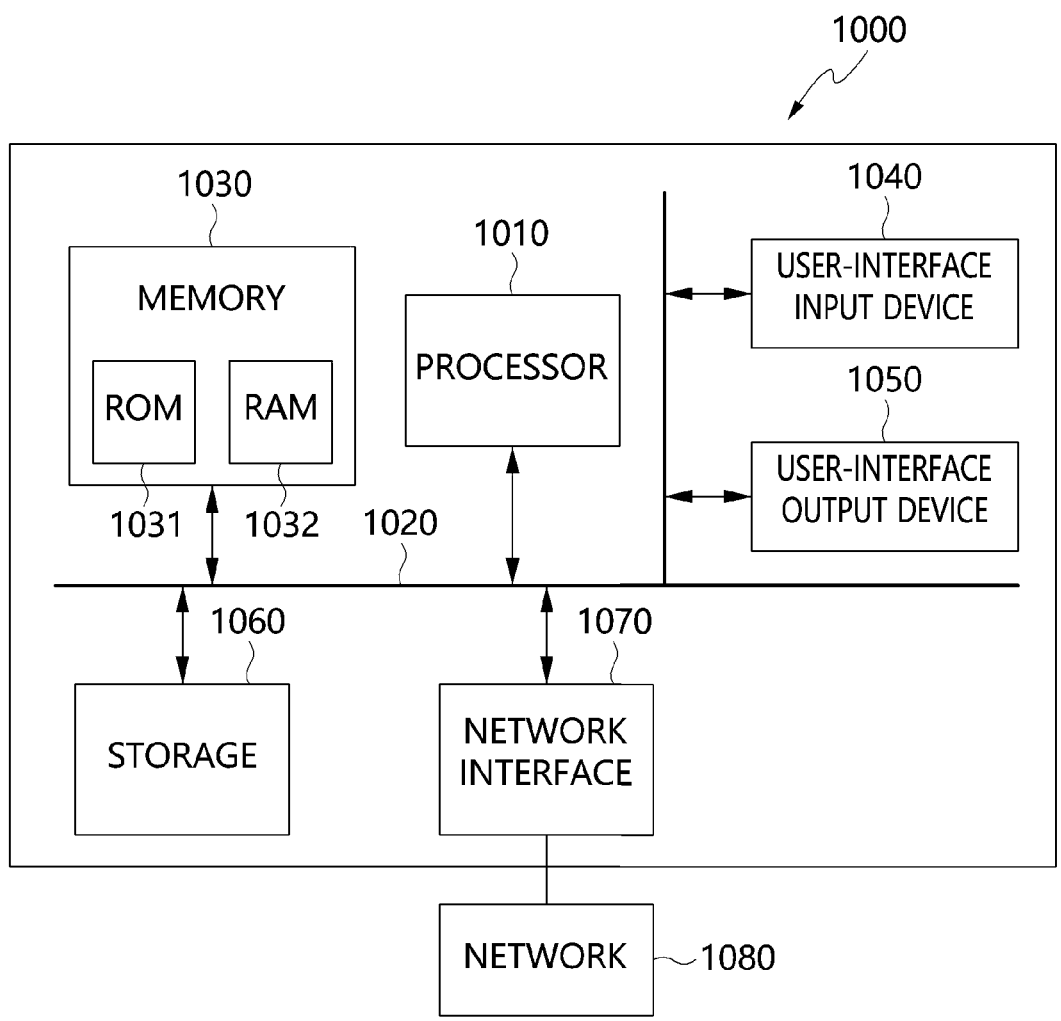
FIG. 8 is a view illustrating a computer system configuration according to an embodiment.

FIG. 8 is a view illustrating a computer system configuration according to an embodiment.

The apparatus 100 for tracking a missing person based on attributes according to an embodiment may be implemented in a computer system 1000 such as a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060.

Here, the program according to an embodiment may perform the method for tracking a missing person based on attributes, which is described above with reference to FIGS. 1 to 7.

The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

Although the embodiments of the present disclosure have been described with reference to the accompanying drawings, those skilled in the art to which the present disclosure pertains will appreciate that the present disclosure may be practiced in other specific forms without changing the technical spirit or essential features of the present disclosure.

Therefore, the embodiments described above are illustrative in all aspects and should not be understood as limiting the present disclosure.

The invention claimed is:

1. An apparatus for tracking a missing person based on attributes, comprising:
   memory in which at least one program is recorded; and
   a processor for executing the program,
   wherein the program performs
   receiving a missing person report which includes attribute information for representing appearance of a missing person and missing situation information including a time and a location at the time of disappearance,
   acquiring CCTV video based on the missing situation information,
   extracting full-body image candidates assumed to be of the missing person, among full-body images of human objects contained in the acquired CCTV video, based on the attribute information,
   receiving a selection for one of the extracted full-body image candidates as a full-body image of the missing person, and
   analyzing CCTV video based on the selected full-body image of the missing person, thereby tracking a travel path of the missing person, wherein the program performs:
   extracting the full-body images of the respective human objects contained in the acquired CCTV video when extracting the full-body image candidates,
   calculating a degree of matching between each of the full-body images and an attribute for representing the appearance of the missing person based on deep-learning, and
   selecting a predetermined number of full-body image candidates in descending order of calculated degree of matching.

2. The apparatus of claim 1, wherein:
   the program outputs an attribute information input interface for representing the appearance of the missing person when receiving the missing person report, and
   the attribute information input interface includes a missing person attribute registration window in which a predetermined number of attributes are listed and an attribute selection window in which selectable options for each of the attributes are displayed.

3. The apparatus of claim 1, wherein the program performs
   when calculating the degree of matching, inferring probabilities that the full-body image has respective attributes representing the appearance of the missing person based on a pretrained deep-learning model, and
   adding the inferred probabilities of having the respective attributes.

4. The apparatus of claim 3, wherein, when calculating the degree of matching, the program further performs multiplying each of the inferred probabilities of having the respective attributes by a per-attribute inference accuracy of the deep-learning model and then performs adding the inferred probabilities of having the respective attributes.

5. The apparatus of claim 1, wherein the program includes when tracking the travel path of the missing person,
   collecting CCTV video based on the missing situation information,
   extracting image frames containing at least one human object from the collected CCTV video,
   extracting full-body feature information of the missing person from an image frame assumed to contain the missing person, among the image frames, based on an extracted image of the missing person,
   extracting full-body feature information of all of people contained in the image frames and clustering the image frames into a predetermined number of groups based on the extracted feature information,
   selecting a track group, among the predetermined number of groups, based on a similarity with the full-body feature information of the missing person, and
   tracking the travel path along which the missing person moves based on time and location information of image frames included in the track group.

6. The apparatus of claim 5, wherein the program includes when tracking the travel path of the missing person,
   collecting CCTV video based on the missing situation information,
   extracting image frames containing at least one human object from the collected CCTV video,
   extracting attribute information from full-body images of all people contained in the image frames and clustering the image frames into a predetermined number of groups based on the extracted attribute information,
   selecting a track group, among the predetermined number of groups, based on a similarity with attribute information of a full-body of the missing person, and
   tracking the travel path along which the missing person moves based on time and location information of image frames included in the track group.

7. A method for tracking a missing person based on attributes, comprising:
   receiving a missing person report which includes attribute information for representing appearance of a missing person and missing situation information including a time and a location at the time of disappearance;
   acquiring CCTV video based on the missing situation information;
   extracting full-body image candidates assumed to be of the missing person, among full-body images of human objects contained in the acquired CCTV video, based on the attribute information;
   receiving a selection for one of the extracted full-body image candidates as a full-body image of the missing person; and
   analyzing CCTV video based on the selected full-body image of the missing person, thereby tracking a travel path of the missing person, wherein extracting the full-body image candidates includes:
   extracting the full-body images of the respective human objects contained in the acquired CCTV video,
   calculating a degree of matching between each of the full-body images and an attribute for representing the appearance of the missing person based on deep-learning, and
   selecting a predetermined number of full-body image candidates in descending order of calculated degree of matching.

8. The method of claim 7, wherein:
   receiving the missing person report comprises outputting an attribute information input interface for representing the appearance of the missing person, and
   the attribute information input interface includes a missing person attribute registration window in which a predetermined number of attributes are listed and an attribute selection window in which selectable options for each of the attributes are displayed.

9. The method of claim 8, wherein calculating the degree of matching comprises inferring probabilities that the full-body image has respective attributes representing the appearance of the missing person based on a pretrained deep-learning model, and adding the inferred probabilities of having the respective attributes.

10. The method of claim 9, wherein calculating the degree of matching further includes multiplying each of the inferred probabilities of having the respective attributes by a per-attribute inference accuracy of the deep-learning model before adding the inferred probabilities of having the respective attributes.

* * * * *